United States Patent [19]

Tamura et al.

[11] Patent Number: 5,103,551
[45] Date of Patent: Apr. 14, 1992

[54] MACHINE FOR HOLDING WORKPIECE

[75] Inventors: Kinichi Tamura, Tokyo; Susumu Kawada, Kamakura; Yoshitada Sekine, Tokyo; Kazuyoshi Abe, Tokyo; Ryosuke Ishikawa, Tokyo; Fumiki Yokota, Yamato, all of Japan

[73] Assignee: Nissan Motor Co., Ltd., Yokohama, Japan

[21] Appl. No.: 561,563

[22] Filed: Aug. 2, 1990

Related U.S. Application Data

[62] Division of Ser. No. 309,130, Feb. 13, 1989, Pat. No. 4,962,917, which is a division of Ser. No. 25,975, Mar. 16, 1987, Pat. No. 4,811,935, which is a division of Ser. No. 724,577, Apr. 18, 1985, Pat. No. 4,691,905.

[51] Int. Cl.⁵ .............................................. B25B 27/14
[52] U.S. Cl. ........................................ 29/559; 269/296; 269/237; 269/152; 29/281.4; 901/39; 414/740
[58] Field of Search ...................... 269/71, 34, 37, 56, 269/58, 152, 59, 104, 296, 237; 414/735, 740; 901/31, 36, 39, 28, 29; 294/116, 118, 88; 29/281.4, 281.5, 559

[56] References Cited

U.S. PATENT DOCUMENTS

| | | | |
|---|---|---|---|
| 3,262,593 | 7/1966 | Hainer | 901/31 |
| 4,780,047 | 10/1988 | Holt et al. | 901/28 |
| 4,781,518 | 11/1988 | Paavila | 414/740 |
| 4,858,901 | 8/1989 | Okuyama et al. | 269/34 |

Primary Examiner—Robert C. Watson
Attorney, Agent, or Firm—Foley & Lardner

[57] ABSTRACT

For holding a plurality of different, in shape, workpieces, a holding unit comprises a laminated body with a number of thin identical shaped elongate plates which have one ends forming a workpiece supporting surface, a vibrator unit for moving the elongate plates so as to vary the shape of the workpiece supporting surface to create a new one, and a bias mechanism for clamping the laminated body, so the newly created shape of the workpiece supporting surface is maintained.

4 Claims, 18 Drawing Sheets

FIG.5(A)
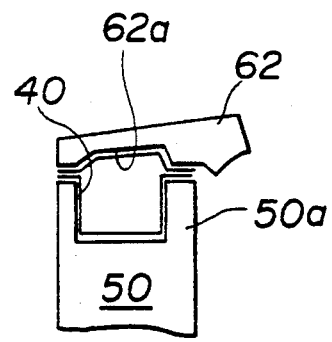
FIG.5(B)
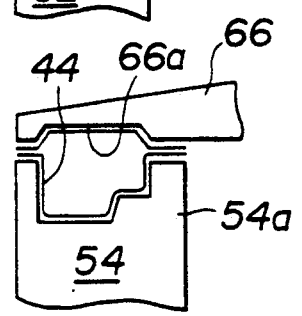
FIG.5(C)
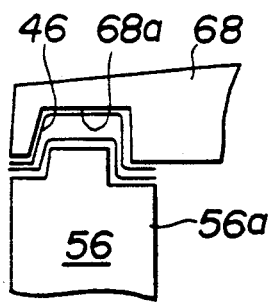
FIG.5(D)
FIG.5(E)
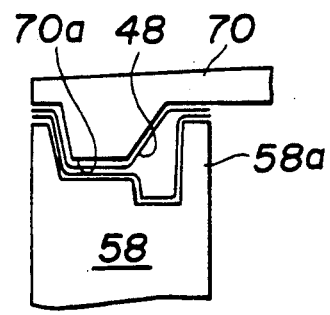

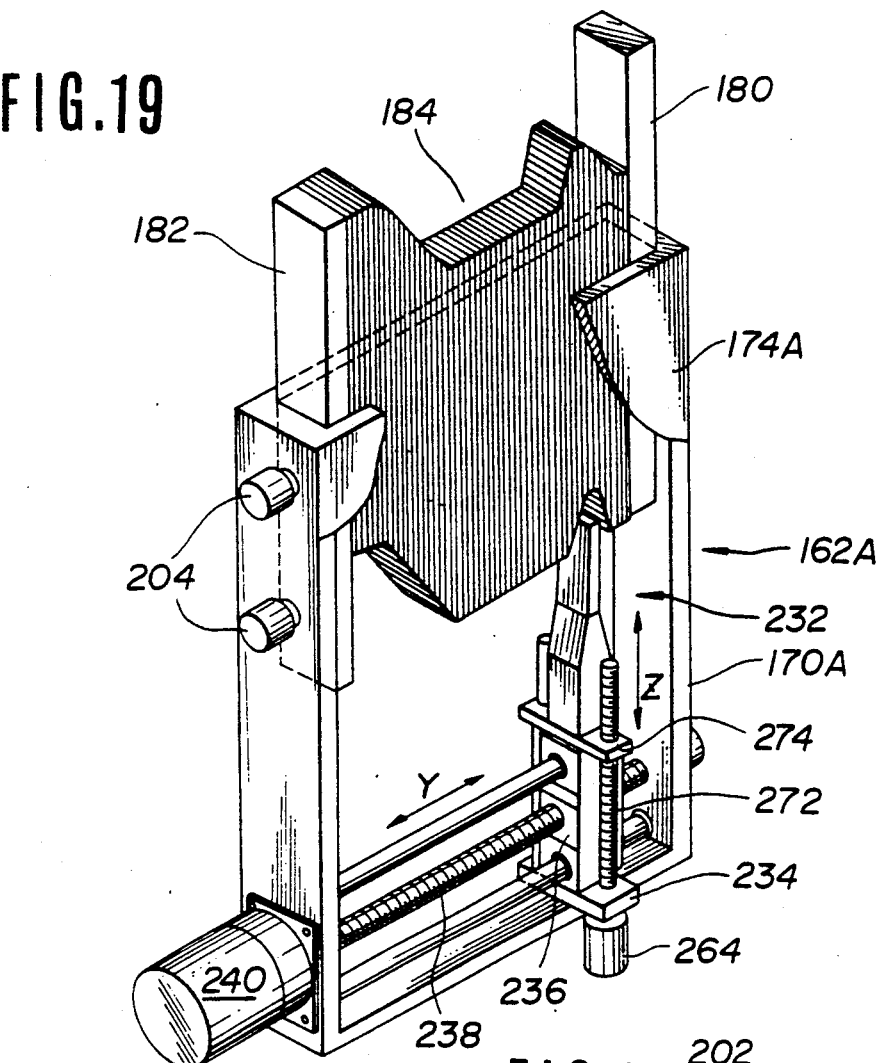
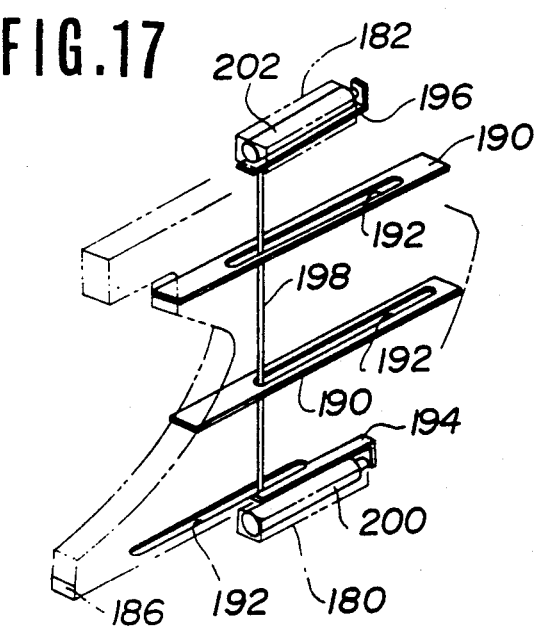

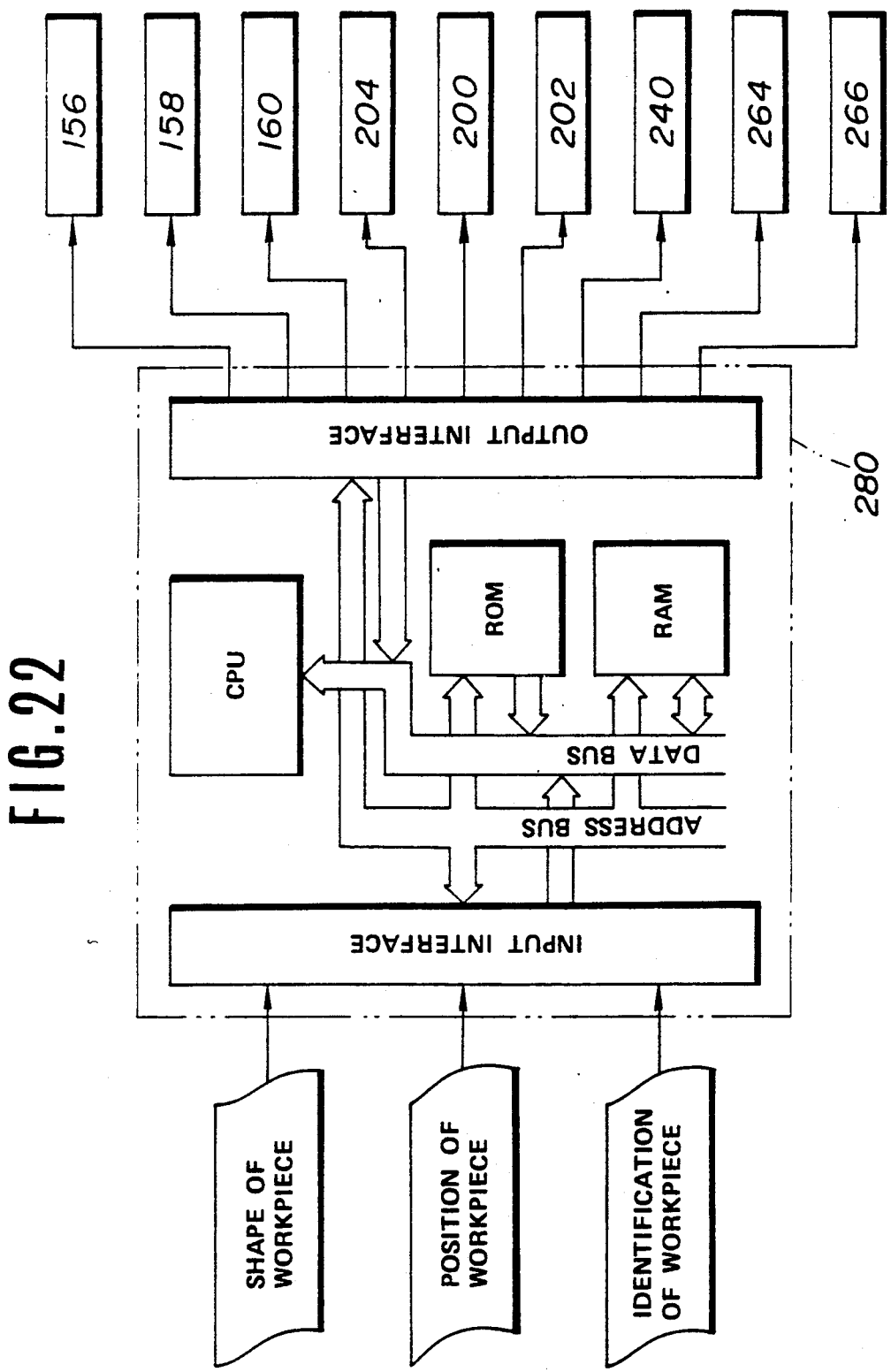

MACHINE FOR HOLDING WORKPIECE

This application is a division of application Ser. No. 07/309,130, filed on Feb. 13, 1989, now U.S. Pat. No. 4,962,917 which is a divisional of Ser. No. 07/025,975 filed on Mar. 16, 1987, now U.S. Pat. No. 4,811,935, which is a divisional of Ser. No. 06/724,577 filed Apr. 18, 1985, now U.S. Pat. No. 4,691,905.

BACKGROUND OF THE INVENTION

The present invention relates to a machine for holding a workpiece and a holding unit usable in the machine.

The machines of the above kind are widely used to hold and position a vehicle body component part, such as a vehicle body panel, when welding to the other vehicle body component parts.

FIG. 1 shows a known jig machine used in welding operation in a vehicle body assembly line which is designed to hold and position a front pillar W as a workpiece. As shown, there are four posts 2 standing upright on a base 1 and secured thereto by bolts 10. Supported on a top portion of each of the four posts 2 is a workpiece supporting device 3, viz., a gage plate, with a cutout 3a having a shape suitable for reception of the workpiece. In order to assist the machine in positioning the workpiece, a locate pin 5 is attached to one of the posts 2 via a mounting bracket 4. In order to fixedly keep the workpiece within the cutouts 3a of the workpiece supporting devices 3, each of the posts 2 has a pivotable clamp member 7 which is actuated by an actuator 8 to move to a closed position as illustrated in which it presses the workpiece W against the cutout 3a defining surface, so as to clamp the workpiece W therebetween. After the workpiece W is positioned as illustrated, a spot welding operation is performed by a welding robot, not illustrated. Designated by the reference numeral 9 are locate pins which are used to position the posts 2 relative to the base 1 before they are secured to the base 1 by means of the bolts 10.

The accuracy with which the workpiece is welded in assembling vehicle bodies is largely dependent on the accuracy with which the machine is adjusted. The adjustment is made by fixing the workpiece supporting device 3 to each of the posts 2 and then positioning the posts 2 relative to the base 1 before fixedly fastening the mounting bolts 10. Since the shape of each cutout 3a and that of each clamp member 7 cannot be used for holding and positioning another different workpiece, its use is confined to the single sort of workpiece. The known machine, therefore, cannot be used for different workpieces without replacing it as a whole including the base and thus it poses a problem that it cannot be used in a flexible manufacturing system where different types of automobiles are assembled in the same assembly line continuously.

In order to alleviate the problem encountered in the prior art, it has been proposed to arrange side-by-side a plurality of posts 15 with workpiece supporting devices 17 formed with different cutouts which are pivotable and selectively put into an upright operative position where it can support and position the corresponding workpiece, as shown in FIG. 2. This proposal brings about a bulky and space occupying construction as a whole and thus is not considered to provide a satisfactory solution to the problem discussed above.

SUMMARY OF THE INVENTION

According to the present invention, there is provided a machine for holding a plurality of different, in shape, workpieces one after another, including:

a holding unit including a working portion with which said holding unit supports a selected one of the plurality of different workpieces, and means for guiding and positioning said holding unit relative to the selected one workpiece, the holding unit including means for varying said working portion in accordance with which one of the plurality of workpieces is selected.

Another aspect of the present invention is to provide a holding unit including:

a laminated body having a number of substantially identical shaped elongate plates, each having one end and an opposite end, said elongate plates being abuttingly engaged one after another with the one ends thereof cooperating one after another to form a workpiece supporting surface, means for moving the elongate plates in a longitudinal direction thereof so as to vary the shape of the workpiece supporting surface to create a new one, and means for biasing the laminated body so that the elongate plates are firmly engaged one after another so as to keep the newly created shape of the workpiece supporting surface.

An object of the present invention, therefore, is to provide a machine for holding a plurality of different, in shape, workpieces one after another and thus suitable for use in a flexible manufacturing system.

BRIEF DESCRIPTION OF THE DRAWINGS

FIGS. 5(A) to 5(E) are fragmentary views of different workpiece supporting devices of a holding unit of the embodiment shown in FIG. 3;

FIGS. 17 and 18 are diagrammatic perspective views showing a mechanism for urging a laminated body to restore its initial shape;

FIG. 19 is a perspective view showing a modified holding unit;

FIG. 22 is a block diagram showing the control concept of a control unit for the machine shown in FIG. 11.

DESCRIPTION OF THE PREFERRED EMBODIMENTS

Hereinafter, the present invention is further described referring to FIGS. 3 to 23 of the accompanying drawings which illustrate various preferred embodiments of a workpiece holding machine according to the present invention.

Figure 1:
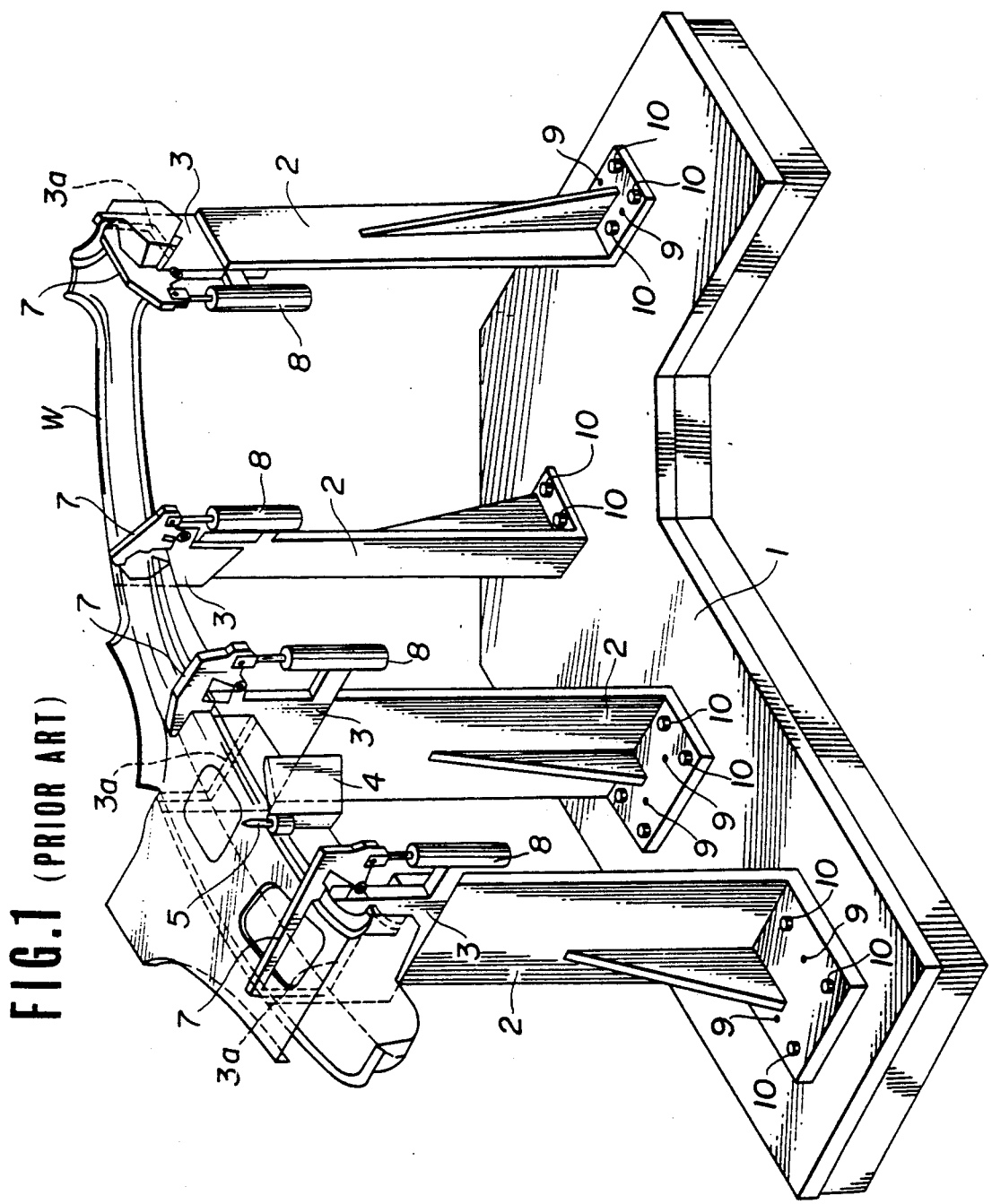
FIG. 1 is a perspective view of the known machine discussed above.
Figure 2:
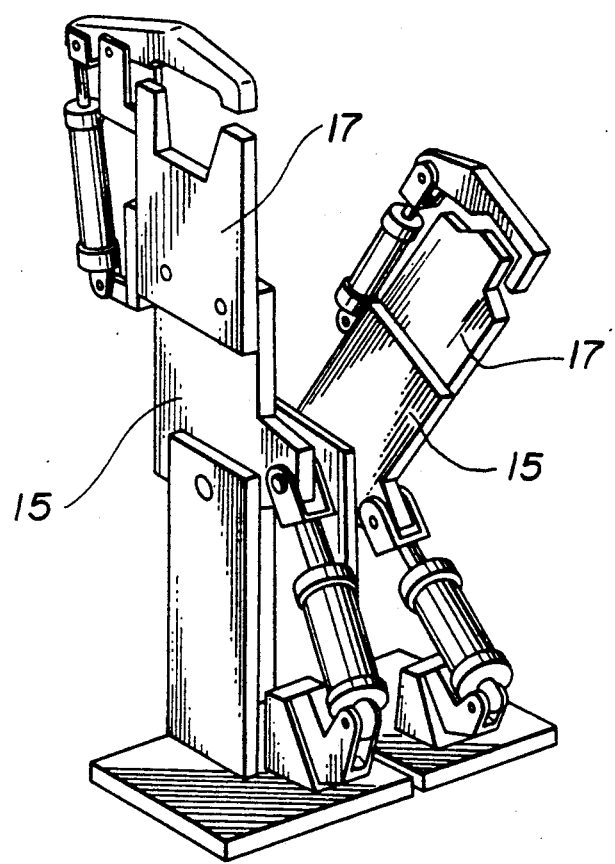
FIG. 2 is a perspective view of another machine discussed above.
Figure 3:
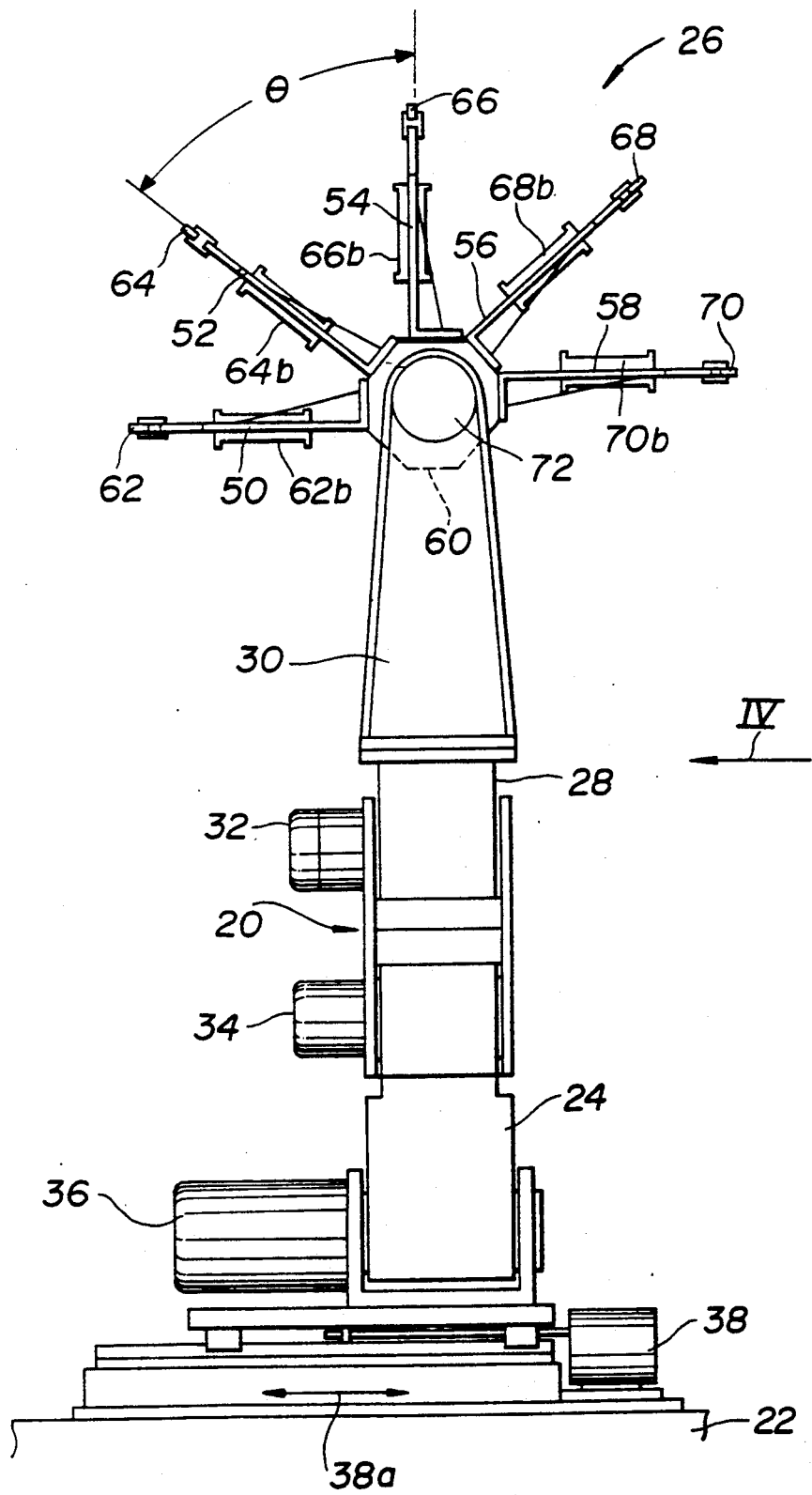
FIG. 3 is a front elevation of a first embodiment of a workpiece holding machine according to the present invention as viewed in FIG. 4 in a direction indicated by an arrow III.
Figure 4:
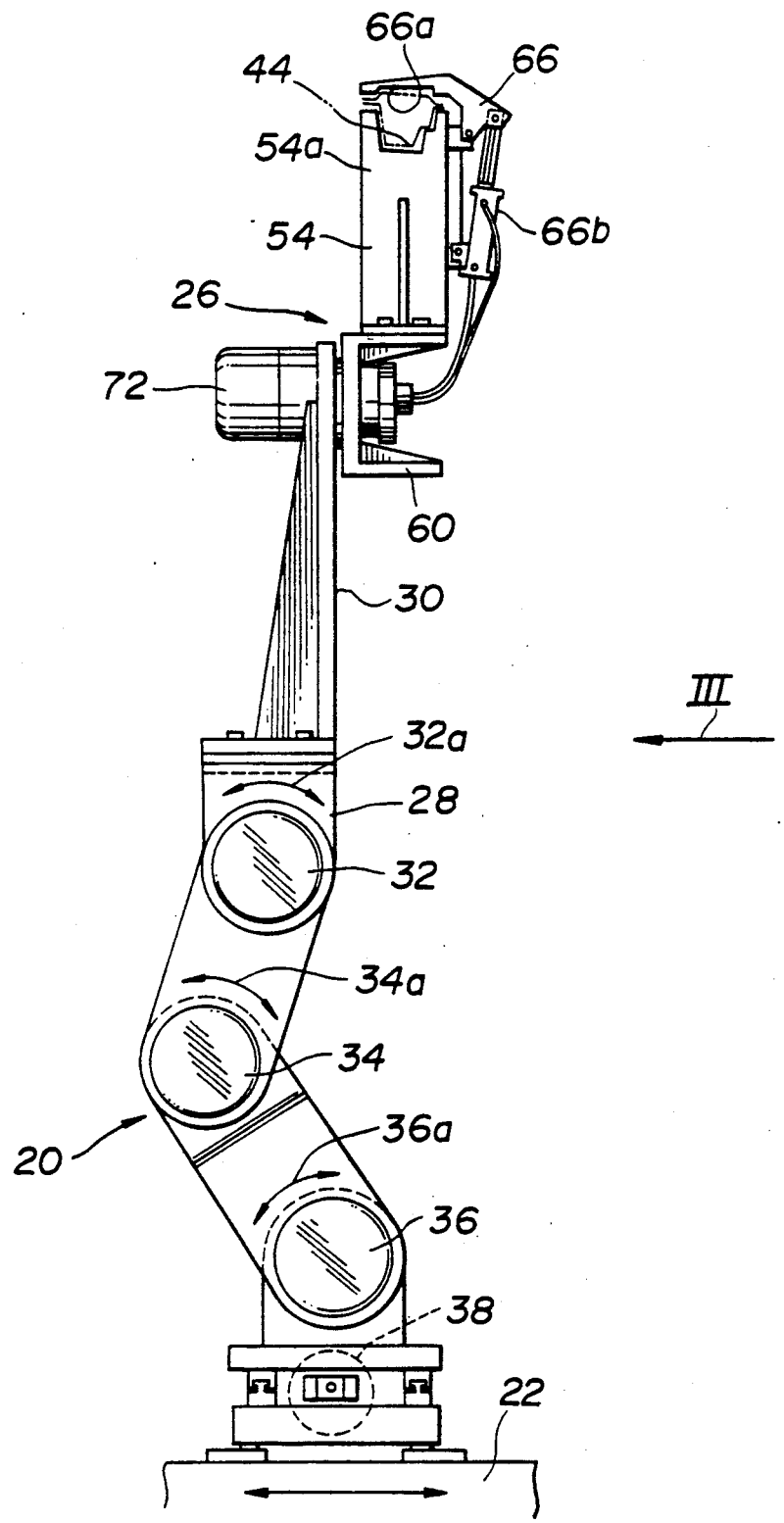
FIG. 4 is a side elevation of the first embodiment as viewed in FIG. 3 in a direction as indicated by an arrow IV.
Figure 6:
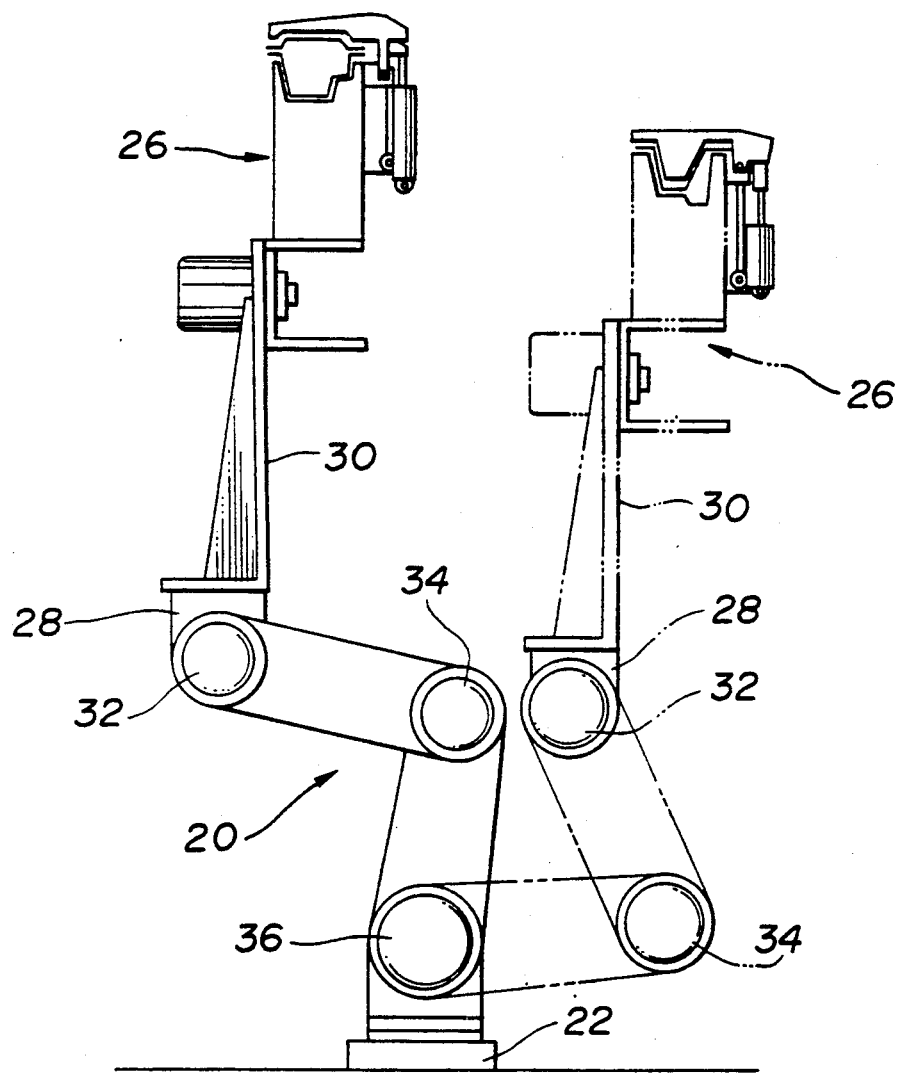
FIG. 6 is a view similar to FIG. 4 showing different operating positions of the machine shown in FIG. 3.

Referring to FIGS. 3, 4 and 5(A) to 5(E), the first embodiment of a workpiece holding machine is described. As illustrated in FIGS. 3 and 4, the machine generally designated by the reference numeral 20 comprises a base 22, a manipulator 24, in the form of an articulate type robot, mounted on the base 22, and a holding unit 26 mounted on a wrist portion 28 of the manipulator 24 via a mounting bracket 30.

The manipulator 24 functions not only to support the holding unit 26 but also to guide and position it upon receiving a position indicative signal. In this embodiment, the manipulator 24 is in the form of the articulate type robot having four actuators 32, 34, 36 and 38 for three rotary motions as indicated by arrows 32a, 34a and 36a (see FIG. 4) and one straight-line motion as indicated by an arrow 38a (see FIG. 3). Thus, this robot has four axes including three axes for rotary motions and one axis for a straight-line motion. If desired, another type of robot may be used. The number of axes for motions and control method are subject to variation taking into account a working area where a robot is to operate.

For holding any desired or selected one of five workpieces 40, 42, 44, 46 and 48 having different cross sectional shapes, respectively, as shown in FIGS. 5(A) to 5(E), the holding unit 26 comprises, as a working portion, five workpiece supporting devices 50, 52, 54, 56 and 58 fixedly secured to a rotary seat 60 rotatable relative to the bracket 30. The workpiece supporting devices 50, 52, 54, 56 and 58 are in the form of an elongate plate and extend radially outwardly from the rotary seat 60 and arranged equiangularly by an angle $\theta$ as best seen in FIG. 3. As best seen in FIGS. 5(A) to 5(E), the workpiece supporting devices 50, 52, 54, 56 and 58 have radially outer end portions 50a, 52a, 54a, 56a and 58a with different shapes which are in mating relationship with the cross sectional shapes of the five different workpieces 40, 42, 44, 46 and 48, respectively. As best seen in FIGS. 5(A) to 5(E), the workpiece supporting devices 50, 52, 54, 56 and 58 have clamp bars 62, 64, 66, 68 and 70 pivoted thereto. These clamp bars 62, 64, 66, 68 and 70 are pivotably movable by actuators 62b, 64b, 66b, 68b and 70b (see FIG. 3), respectively, between closed position as illustrated in FIGS. 5(A)–5(E) and open position (not illustrated). The holding unit 26 further comprises an actuator 72 adapted to angularly move the rotary seat 60 so as to move a selected one (the workpiece supporting device 54 in FIG. 3) of the workpiece supporting devices into an upright position (as illustrated in FIG. 3) where the selected workpiece supporting device can properly support the workpiece 54a. The clamp bars 62, 64, 66, 68 and 70 are formed with press surfaces 62a, 64a, 66a, 68a and 70a, respectively, which substantially mate with the shapes of the corresponding workpieces 40, 42, 44, 46 and 48.

When it is needed to hold another differently shaped workpiece, a workpiece supporting device suitable for the new one is selected among the five workpiece supporting devices, and the actuator 72 is activated to turn the rotary seat 60 until the selected workpiece supporting device assumes the upright (or zero) position. For example, a change is needed from workpiece 44 to new workpiece 42, the actuator 72 turns the rotary seat 60 clockwise from the position as illustrated in FIG. 3 by an angle $\theta$ until the new workpiece supporting device 52 assumes the upright or zero position.

When the shape of a new workpiece demands that the holding unit 26 itself is to be moved or positioned, the actuators 32, 34, 36 and 38 are selectively activated to position the holding unit 26 until a good supporting relationship with the workpiece is established.

In practice, the above mentioned actions are performed automatically after taking out a suitable position indicative information, stored in a position control unit, depending on a workpiece identification signal.

From the previous description, it will now be understood that a plurality of different, shaped, workpieces can be dealt with by the machine according to the present invention. What is necessary is to equip the holding unit 26 with a plurality of workpiece supporting devices having differently shaped end portions 50a, 52a, 54a, 56a and 58a which mate with the cross sectional shapes of different workpieces. Preferrably, the workpiece supporting devices are detachable from the rotary seat 60.

Figure 7:
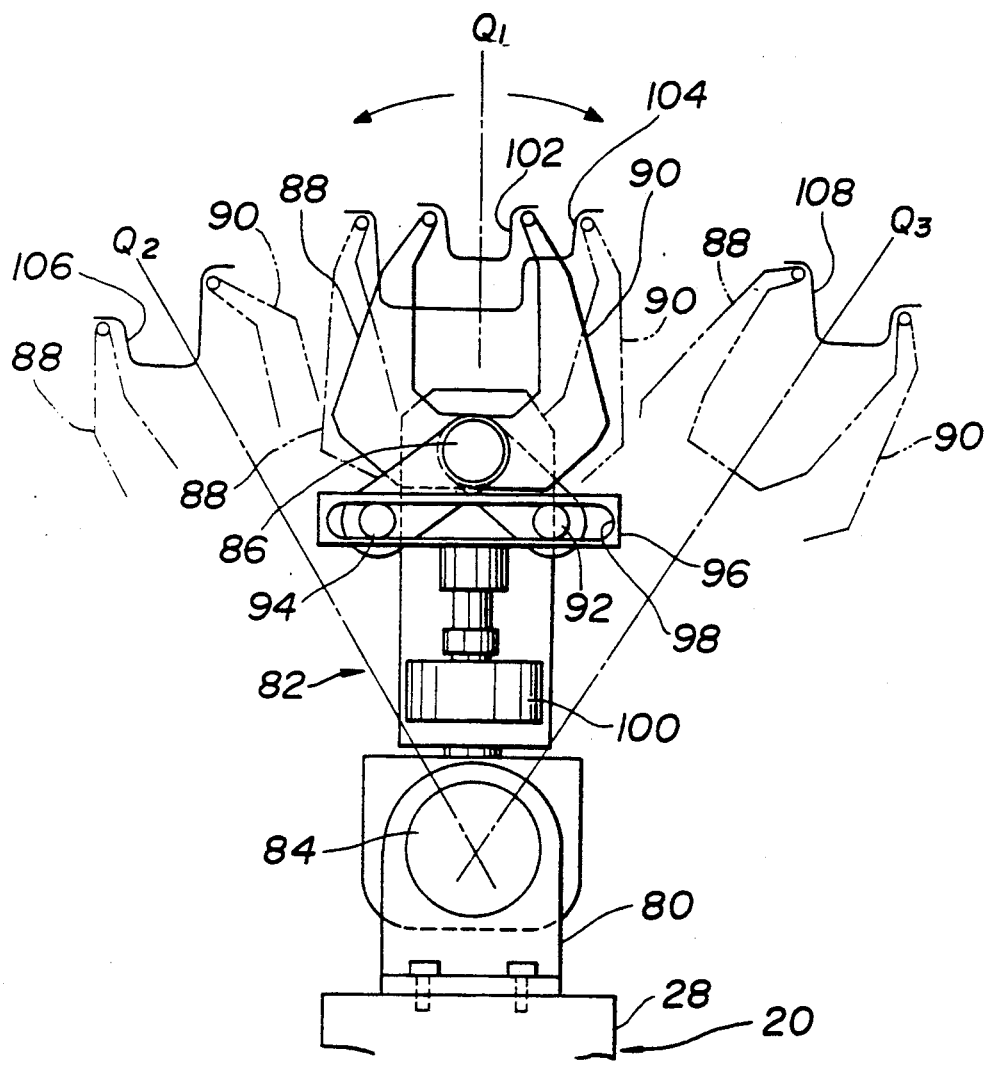
FIG. 7 is a fragmentary front elevation of a second embodiment showing a holding unit thereof.

Referring to FIG. 7, the second embodiment according to the present invention is described. This embodiment is substantially similar to the first embodiment, but is different in that a holding unit 82 of the finger type is used. As shown in FIG. 7. the holding unit 82 is mounted on a wrist portion 28 of a robot 24 via a mounting bracket 80. A first actuator or motor 84 is mounted on the mounting bracket 80 to swing the holding unit 82 counter clockwise from the upright position $Q_1$ to an inclined position $Q_2$ or clockwise therefrom to another inclined position $Q_3$. The holding unit 82 includes, as a working portion, a pair of hinged fingers 88 and 90 pivotable about a common hinge pin 86. The hinged fingers 88 and 90 have one end portions adapted to support a workpiece and opposite portions formed with guide pins 92 and 94, respectively. The guide pins 92 and 94 are slidably received in a guide groove 98 with which a link 96 is formed. A second actuator 100 is provided to actuate the link 96 upwards, as viewed in FIG. 7, or downwards. The upward movement of the link 96 causes the guide pins 92 and 94 to be displaced away from each other within the guide groove 98, thus opening the fingers 88 and 90 from the fully drawn position to a phantom line drawn position. The downward movement of the link 96 causes closing movement of the fingers 88 and 90. In this manner, the distance between the one end portions of the fingers 88 and 90 is varied so as to mate with the cross sectional shape of a workpiece to be supported.

According to this embodiment, therefore, the actuator 84 is activated to swing the holding unit 82 to any one of angular positions $Q_1$, $Q_2$ and $Q_3$, and then the second actuator 100 is activated to adjust the degree of opening of the hinged fingers 88 and 90 to support and position different workpieces 102, 104, 106 and 108.

Figure 8:
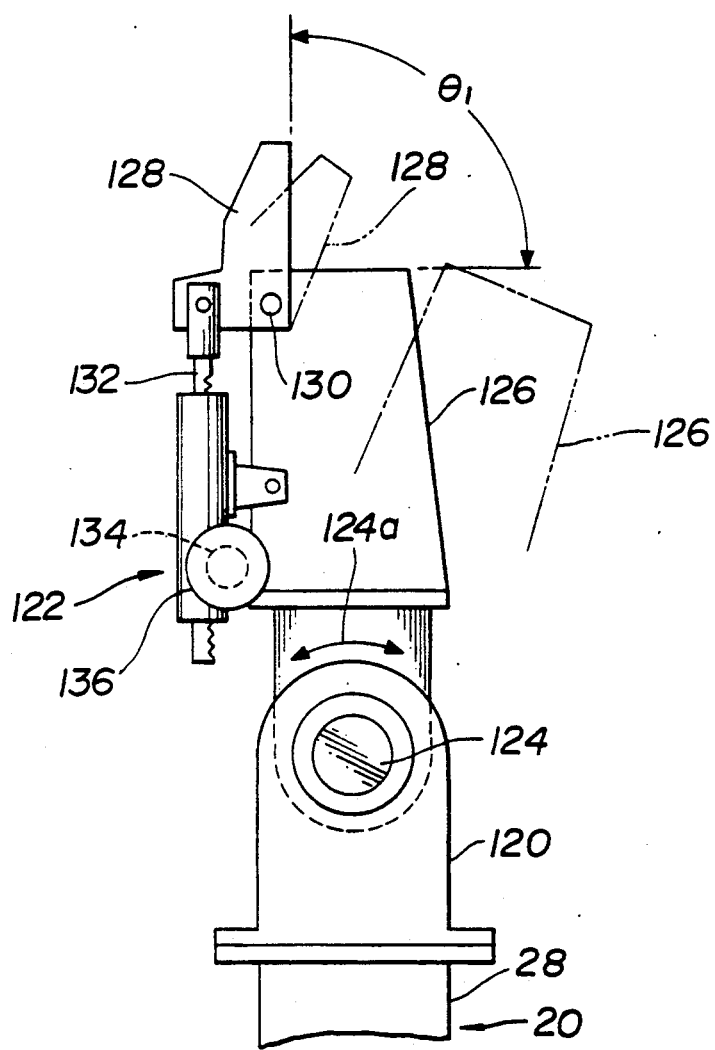
FIG. 8 is a fragmentary front elevation of a third embodiment showing a holding unit thereof.
Figure 9A:
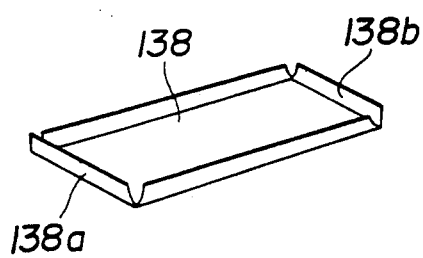
FIGS. 9(A) to 9(C) are perspective views of different workpieces.
Figure 10A:
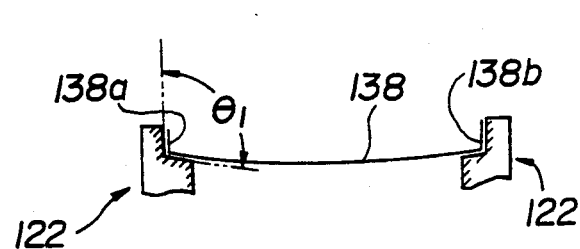
FIGS. 10(A) to 10(C) are diagrammatic views showing how to hold the workpieces shown in FIGS. 9(A) to 9(C) by using two of such machines shown in FIG. 8.
Figure 9B:
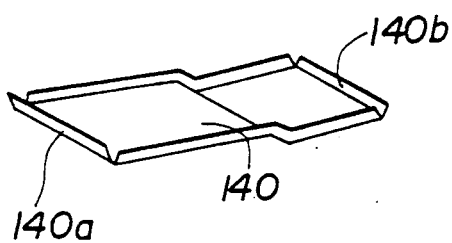
Figure 10B:
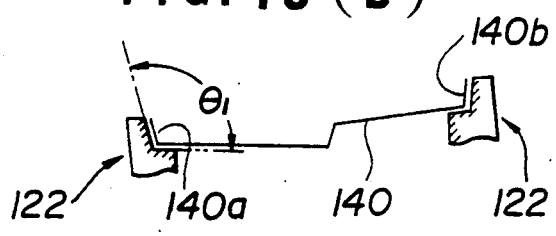
Figure 9C:
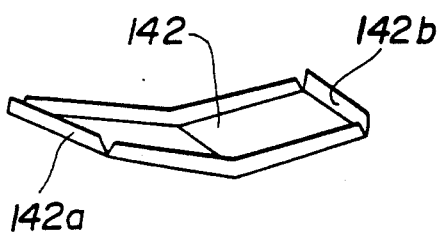
Figure 10C:
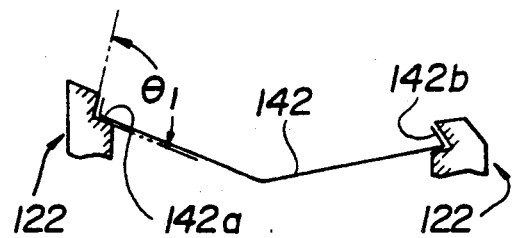
Figure 11:
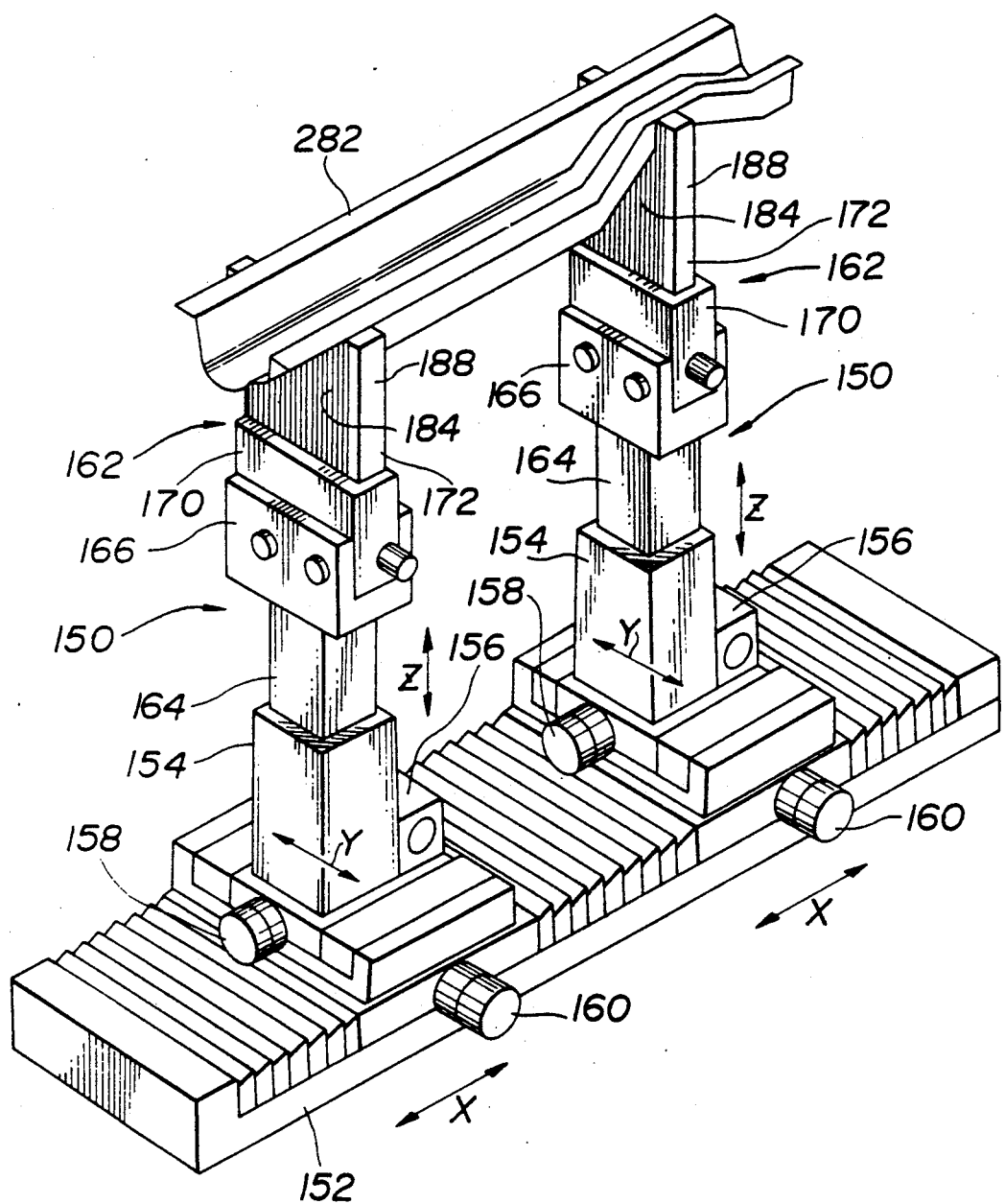
FIG. 11 is a perspective view of a fourth embodiment according to the present invention.

Referring to FIGS. 8, 9(A)–9(C) and FIGS. 10(A)–10(C), the third embodiment according to the present invention is described. This embodiment is substantially similar to the first embodiment, but is different in the construction of a holding unit 122. As shown in FIG. 8, the holding unit 122 is mounted on a wrist portion 28 of a robot 20 via a mounting bracket 120. A first actuator 124 is mounted on the mounting backet 120 and is adapted to swing, in two directions as indicated by two heads arrow 124a, the holding unit 122 from a fully drawn position to a phantom line drawn position. The holding unit 122 includes, as a working portion, a first holding plate 126 stationary relative to the holding unit 122 and a second holding plate 128 pivoted to the stationary plate 126 by means of a hinge pin 130. In order to vary an angle $\theta_1$ defined between the first and second holding plates 126 and 128, an actuator 136 is provided which drives a pinion 134 meshing with a rack 132 that has one end pivotally connected with the second plate 128. In supporting a workpeice 138 with different angled flanges 138a and 138b shown in FIG. 9A, two such machines as shown in FIG. 8 are used. By activating the actuator 124 and then the actuator 136, the angle $\theta_1$ is varied so as to mate the angle of the flange 138a. In the same manner, the angle $\theta_1$ of another machine is adjusted to mate with the other flange 138b of the workpiece 138. The angle $\theta_1$ of the machine shown in FIG. 8 can be varied so as to mate with angled flanges 140a and 140b of a workpiece 140 shown in FIG. 9(B) or angled flanges 142a and 142b of a workpiece 142 shown in FIG. 9(C), these workpieces 140 and 142 may be supported and positioned by the two such machines shown in FIG. 8 in the manner as shown in FIGS. 10(B) and 10(C), respectively.

Referring mainly to FIGS. 11 to 18, the fourth embodiment of a workpiece holding machine according to the present invention is described. In an example illustrated in FIG. 11, two of such machines, each generally designated by the reference numeral 150, are used. The machine 150 comprises a base 152, a robot 154 having a first actuator 156 for a Z-direction movement, a second actuator 158 for a Y-direction movement and a third actuator 160 for a X-direction movement, and a holding unit 162 mounted on a wrist portion 164 of the robot 154 via a mounting bracket 166. Owing to the actuators 156, 158 and 160, the robot 150 can move the holding unit 162 in three directions.

Figure 12:
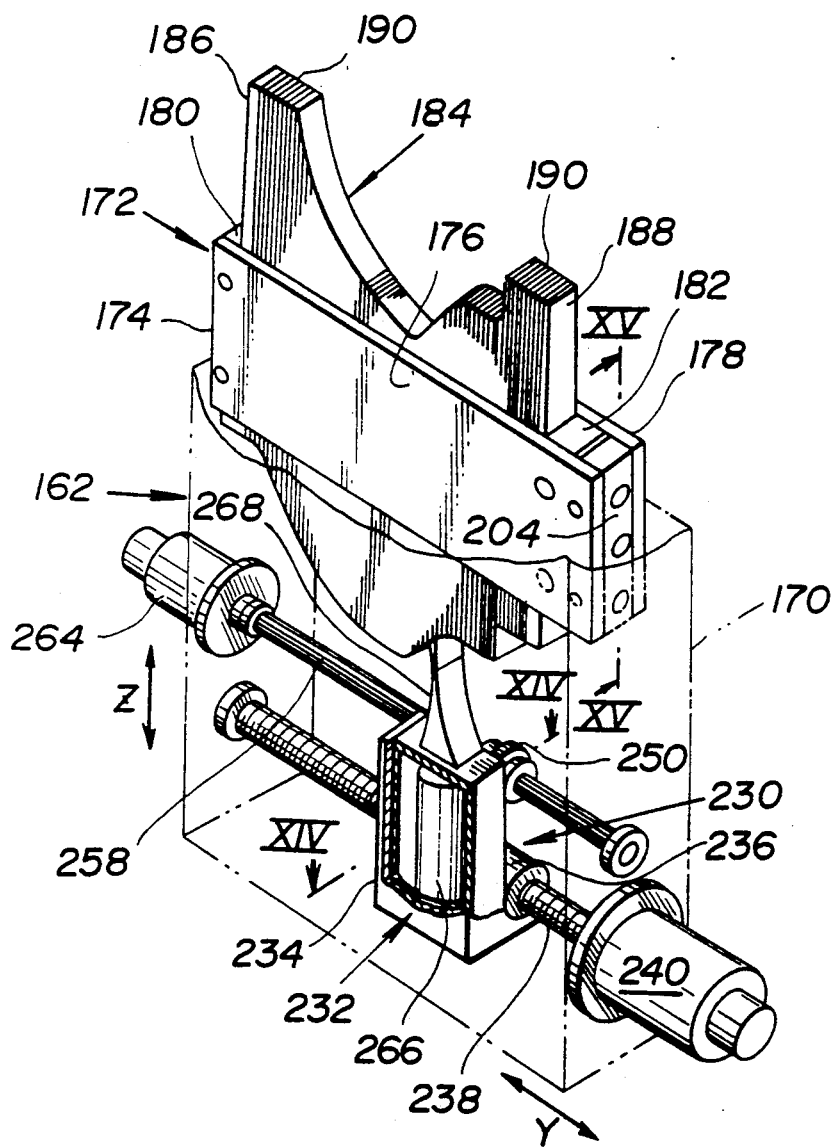
FIG. 12 is a perspective view of a holding unit used in the machine shown in FIG. 11.
Figure 13:
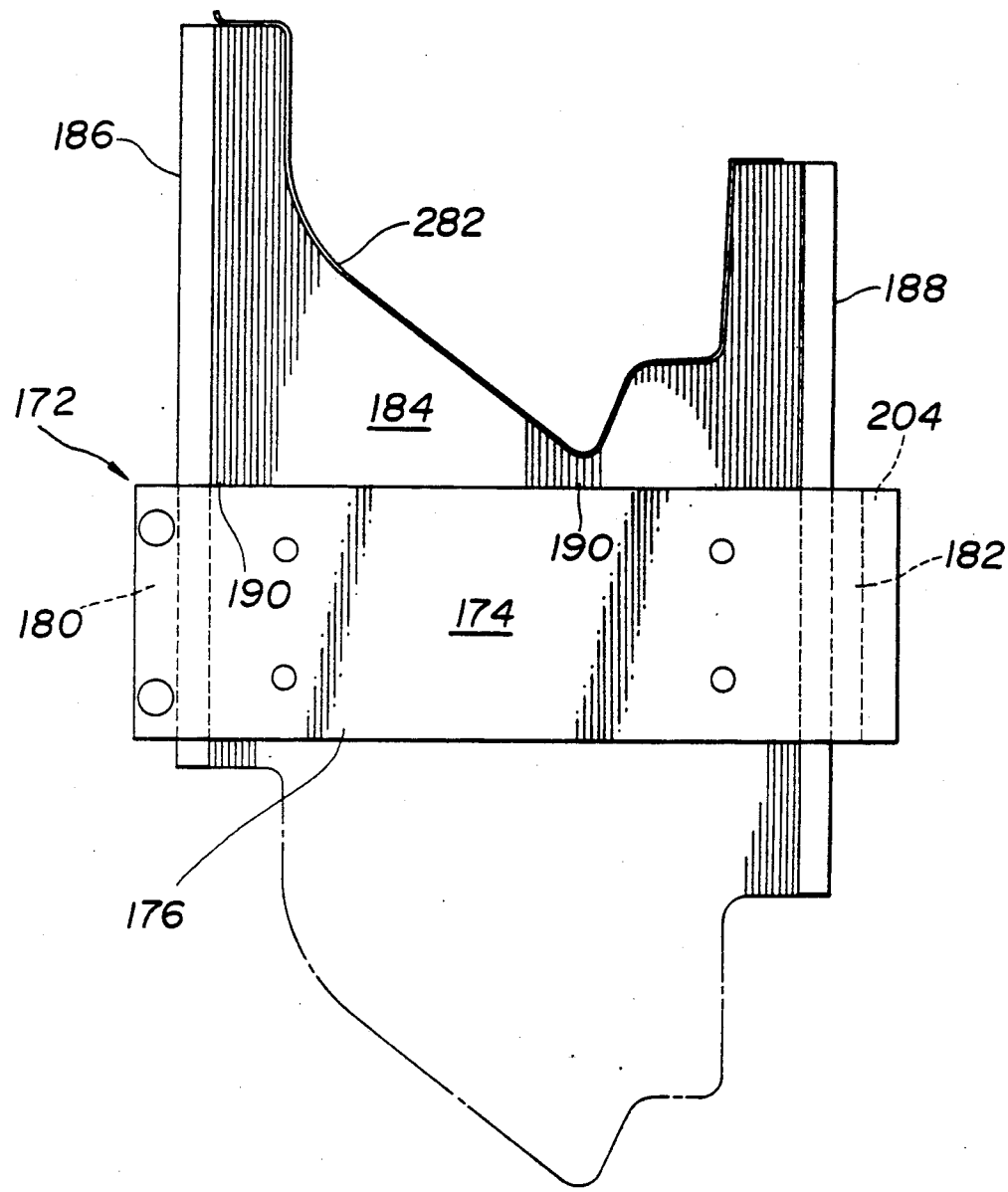
FIG. 13 is a front elevation of a workpiece supporting device.

The holding unit 162 comprises a housing 170 fixedly attached to the mounting bracket 166 and a workpiece supporting device 172 as a working portion. As best seen in FIGS. 12 and 13, the workpiece supporting device 172 includes a frame 174 made up mainly of a pair of parallel guide plates 176 and 178 having therebetween a first spacer 180 and a second spacer 182. The parallel guide plates 176, 178 and two spacers 180, 182 cooperate with each other to define a space within which a laminated body 184 is disposed. The laminated body 184 serves as a workpiece supporting surface geenerating member and includes a plurality of substantially identical sized elongate plates consisting of a pair of rectangular elongate end plates 186, 188 and a considerable number of intermediate thin rectangular plates, each being denoted by 190. All of the elongate plates 186, 188 and 190 are abuttingly engaged one after another.

Referring to FIGS. 17 and 18, each of the rectangular elongate plates 186, 188 and 190 of the laminated body 184 is formed with a guide hole or slot 192 running in a longitudinal direction thereof and a pair of sliders 194 and 196 slidably mounted relative to the first and second spacers 180 and 182, respectively. A beam 198 extends through the guide holes 192 and connected to the sliders 194 and 196. Mounted within the first spacer 180 is an extendable-contractable column or unit 200 operatively connected to the slider 194. Similarly, the second spacer 182 has mounted therein an extendable-contractable column or unit 202 operatively connected to the slider 196. The extendable-contractable units 200, 202, which may be in the form of a hydraulic actuator, extend to urge the first and second sliders 194, 196 to slide to bring all of the working piece supporting surface forming ends of the elongate plates 186, 188 and 190 into substantial alignment to form a flat plane as shown in FIG. 18 before the contraction thereof which takes place after the extention.

Figure 15:
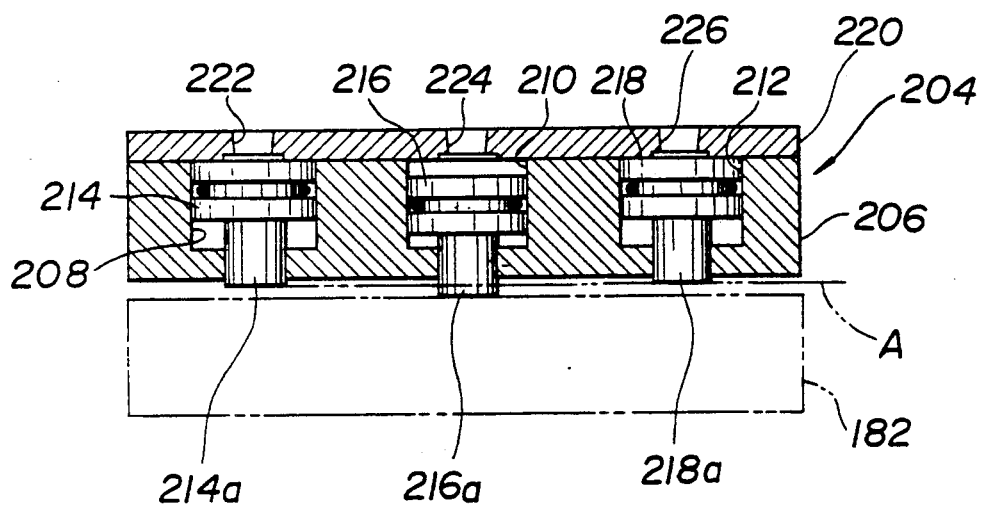
FIGS. 15 and 16 are diagrammatic sectional views, each being taken through the line XV—XV in FIG. 12.
Figure 16:
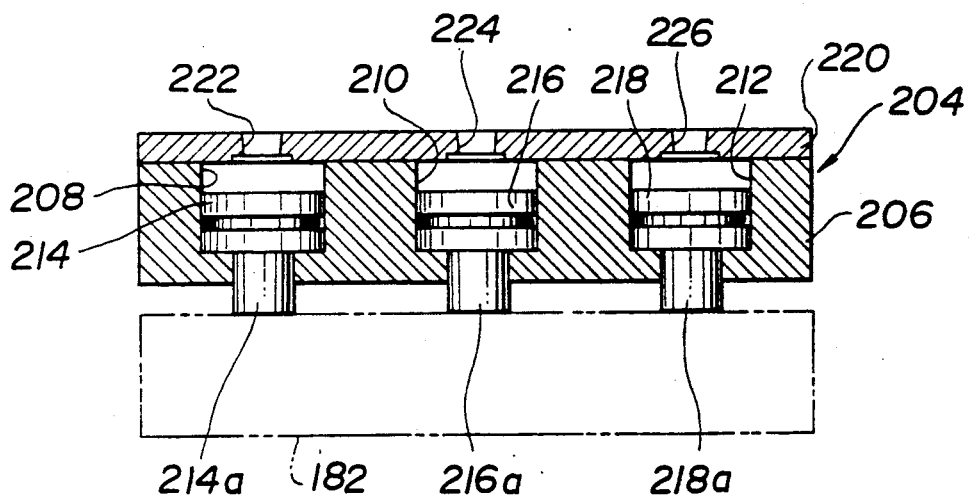
Figure 20A:
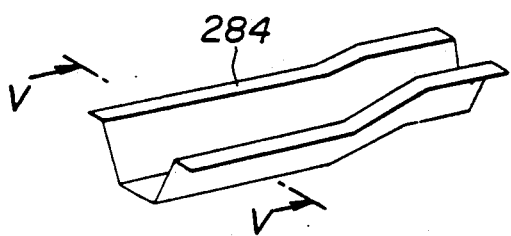
FIGS. 20(A) to 20(D) are perspective views of four different workpieces.
Figure 20B:
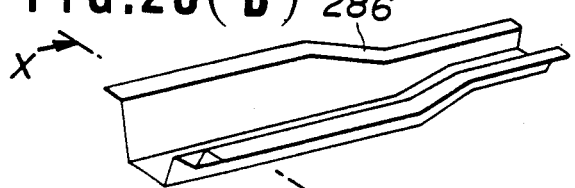
Figure 20C:
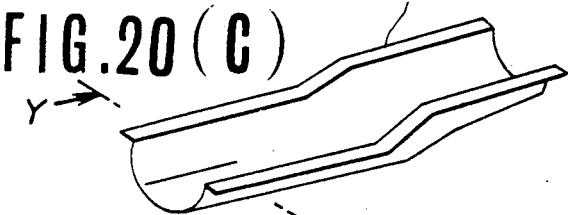
Figure 20D:
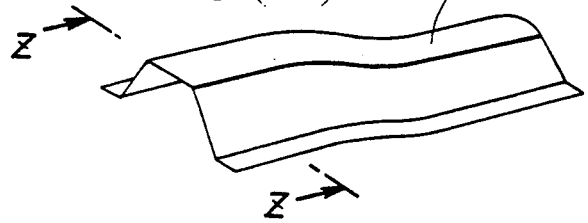

Referring again to FIG. 12, a hydraulically operated biasing mechanism 204 is mounted between the guide plates 176 and 178 and adjacent to the spacer 182. This mechanism 204 is adapted to bias the spacer 182 toward the other spacer 180 so as to clamp the laminated body 184, so the elongate plates 186, 188 and 190 are firmly engaged one after another. As best seen in FIGS. 15 and 16, a plate like cylinder block 206 fixedly attached between the guide plates 176 and 178 is formed with first, second and third differential diameter bores 208, 210 and 212. Slidably received in the first, second and third bores 208, 210 and 212 are hydraulically operated pistons 214, 216 and 218, respectively. These pistons 214, 216 and 218 have integral piston rods 214a, 216a and 218a projecting outwardly from the cylinder block 206 toward the spacer 182 shown in phantom. The pistons 214, 216 and 218 are sealably slidable with the walls defining the bores 208, 210 and 212 between a projected position as shown in FIG. 16 and a retracted position where the ends of the piston rods 214a, 216a and 218a retract to a plane indicated by a phatom line A in FIG. 15. The open ends of the bores 208, 210 and 212 are closed by a head plate 220 secured to the cylinder block 206. The head plate 220 are formed with three connecting holes 222, 224 and 226 opening to the bores 208, 210 and 212, respectively. The bores 208, 210 and 212 are connected via the respective connecting holes 222, 224 and 226 with a source of hydraulic fluid (not shown), so the hydraulic fluid pressure is applied to the pistons 214, 216 and 218 selectively. When the hydraulic fluid is applied to the second bore 210 only, the second piston 216 projects the piston 216a as shown in FIG. 15, so the piston rod 216a acts on the spacer 182 to bias the laminated body 184 to a temporary clamped state where the elongate plates 186, 188 and 190 are loosely engaged so that each of the elongate plates is movable relative to the adjacent ones upon subject to an external load in the longitudinal direction. When all of the bores 208, 210 and 212 receive hydraulic fluid, all of the pistons 214, 216 and 218 project their piston rods 214a, 216a and 218a as shown in FIG. 16. In the position illustrated in FIG. 16, the elongate plates 186, 188 and 190 of the laminated body 184 are firmly engaged, so each of the elongate plates cannot move relative to the adjacent ones so that the laminated body 184 can keep its shape.

Figure 14:
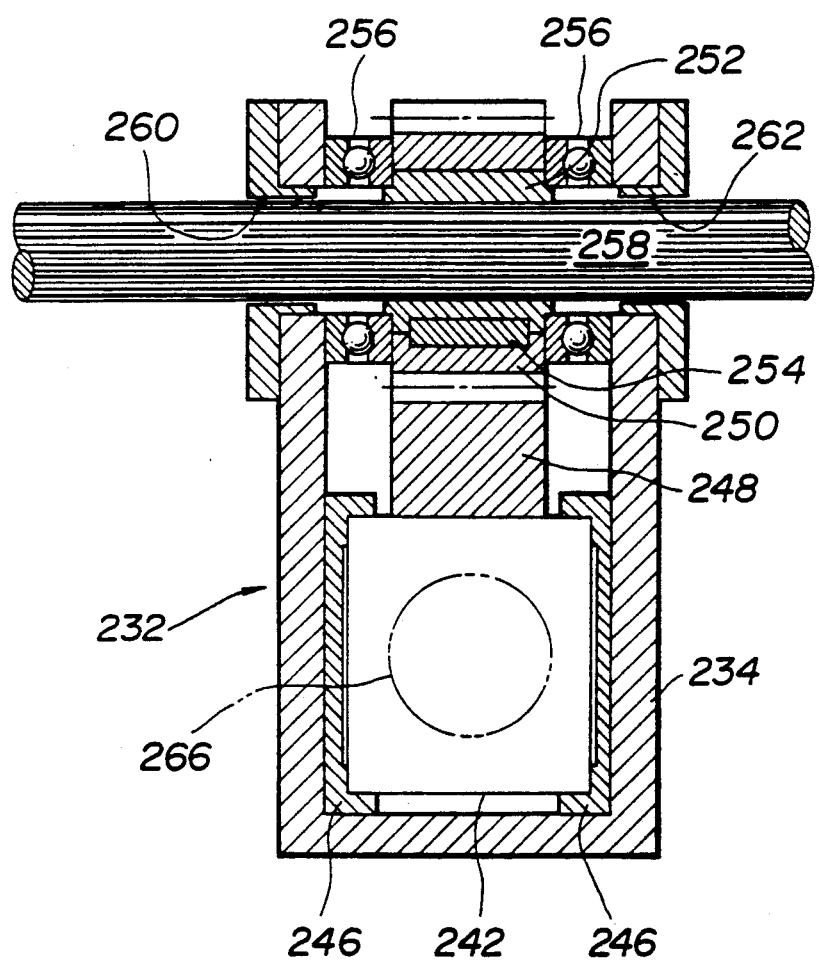
FIG. 14 is a sectional view taken through the line XIV—XIV in FIG. 12.

Referring to FIGS. 12 and 14, a shape generating mechanism 230, including a vibrator unit 232, is disposed within the housing 170 below the workpiece supporting device 172 as viewed in FIG. 12. The vibrator unit 232 comprises a guide housing 234 having fixedly attached thereto a nut 236. Threadedly engaged with and extending through the nut 236 is a screw tapped shaft 238 which extends in the Y-direction and rotatably mounted to the housing 170. A pulse or stepping motor 240 is provided to turn the screw shaft 238. Since the screw tapped on the shaft engages the nut 236 fixedly attached to the guide housing 234, rotation of the screw tapped shaft 238 causes movement of the vibrator unit 232 in the Y-direction. As best seen in FIG. 14, the guide housing 234 has a holder 242 which is slidably received therein via a sliding element 246. The holder 242 is slidable in the Z-direction which is perpendicular to the Y-direction (see FIG. 12). As best seen in FIG. 14, fixedly attached to the holder is a rack 248 meshing with a pinion 250 fixedly connected to a spline tapped nut 252 by a key 254. The spline tapped nut 252 is rotatably supported by the guide housing 234 by means of a pair of bearings 256. The nut 252 is splined to a spline tapped shaft so the guide housing 234 is slidable along the spline tapped shaft 258. This shaft 258 extends through holes 260 and 262 formed through collars fixedly secured to the guide housing 234 and the nut in parallel to the screw tapped shaft 238. The spline tapped shaft 258 is rotatably mounted to the housing 170 and a pulse or stepping motor 264 is provided to turn this shaft 258. Turning the spline tapped shaft 258 causes the holder 242 to move in the Z-direction or toward or away from the laminted body 184. The holder 242 carries an ultrasonic vibrator and a wedge shaped horn 268.

Referring to FIG. 19, a modified holding unit 162A is described which is substantially similar to the holding unit 162 shown in FIG. 12. As different from the holding unit 162, the modified holding unit 162A has an integral structure including a portion 174A serving as a frame and another portion 170A serving as a housing. Another feature is that for feeding a vibrator unit 232 in a Z-direction, a screw tapped shaft 272 and a cooperating nut 274 are used in combination with a pulse motor 264.

Referring to FIG. 22, the concept of a control unit 280 for the workpiece holding machine 150 is shown in block diagram. The control unit 280 includes a CPU, ROM, RAM, input interface and output interface. Information regarding the position of five different workpieces 282 (see FIGS. 11, 13), 284, 286, 288 and 290 (see FIGS. 20(A) to 20(D)) is stored in the ROM in terms of the amounts of displacement in X-direction, Y-direction and X-direction. With this information, the actuators 160, 158 and 156 which are responsible for the displacement of the robot 154 are actuated. Another information regarding the cross sectional shape of these five different workpieces is also stored in the ROM in terms of the amounts of displacement in the Y-direction and Z-direction of the vibrator unit 232 having the ultrasonic vibrator 266. In accordance with this information, the pulse motors 240 and 260 are actuated, so the vibrator unit 232 creates five different, in shape, workpiece supporting surfaces as shown in FIG. 13, 21(A), 21(B), 21(C) and 21(D). The number of workpieces is not limited to five and may be increased, if desired.

Figure 21A:
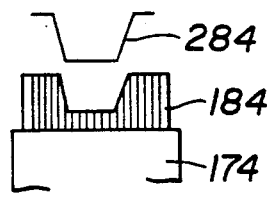
FIGS. 21(A) to 21(D) are diagrammatic views showing the shapes of workpiece supporting surfaces mating with the cross sectional shapes of the workpieces taken through the lines V—V, X—X, Y—Y and Z—Z in FIGS. 20(A) to 20(D), respectively.
Figure 21B:
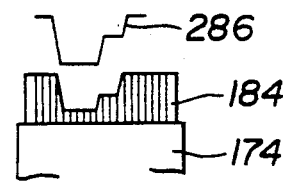
Figure 21C:
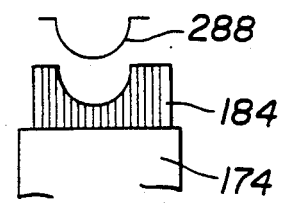
Figure 21D:
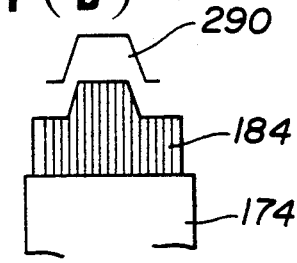

The different identification signals are prepared corresponding to these workpieces, respectively, and linked with the corresponding information in position and that in cross sectional shape. When it is needed to hold one of the workpieces 284, 286, 288 and 290 in place of the workpiece 282, the identification signal for the new workpiece is input to the control unit 280. A change in identification signal causes the control unit 280 to operate the actuators 160, 158 and 156 so as to move the robot 154 to a suitable position for positioning the new workpiece. During this movement of the robot 154, hydraulic fluid is discharged from the biasing mechanism 204 to allow retraction of all of the piston rods 214a, 216a and 218a (see FIG. 15), thus releasing the bias from the laminated body 184. Then, the extendable-contractable units 200, 202 extend to move the beam 198 from the position illustrated in FIG. 17 to the position illustrated in FIG. 18. This movement of the beam 198 brings all of the elongate plates 186, 188 and 190 into initial position as shown in phantom line in FIG. 18, thus breaking the shape of the workpiece supporting surface having been maintained. In this initial state, the ends of all of the elongate plates 186, 188 and 190 of the laminated body 184 are aligned with each other on one and opposite ends to form flat planes, respectively. Then, the middle piston 216 is actuated to project the piston rod 216a, so the laminated body 184 assumes temporary clamped state where each of the elongate plates 186, 188 and 190 is movable relative to the adjacent one or ones upon subject to an external load in the logitudinal direction which is to be applied by the wedge-shaped horn 268. Then, the extendable-contractable units 200 and 202 contract to move back the beam 198 from the position as illustrated in FIG. 18 to the position as illustrated in FIG. 17. After setting the laminated body 184 in the temporary clamped state, the pulse motors 240 and 264 are rotated to provide feed in Y-direction and Z-direction, respectively. At the same time, the ultrasonic vibrator 266 is activated and starts to vibrate the wedge shaped horn 268. Since the vibrator unit 232 is fed in the Y-direction and then Z-direction in accordance with the information regarding the cross sectional shape of the workpiece, the horn 268 acts on the lower ends, as viewed in FIG. 12, of the elongate plates 186, 188 and 190, to push them upwardly by predetermined amounts one after another, thus causing the upper ends, as viewed in FIG. 12 of the elongate plates to create a desired, in shape, workpiece supporting surface such as shown in FIG. 21(A) which is suitable for the cross sectional shape of the workpiece 284 (see FIG. 20(A)). Describing more specifically, the vibrator unit 232 is fed by an amount corresponding to the thickness of each of the elongate plates 190 in the Y-direction before it is fed in the Z-direction by a predetermined amount. Repeating this action results in the generation of a desired in shape workpiece supporting surface by the upper ends of the elongate plates 190. The movement of each of the elongate plates 190 due to the vibrating horn 268 is allowed because the laminated body 184 is kept in the temporary clamped state by the biasing mechanism 204 (see FIG. 15). After the desired workpiece supporting surface has been generated in the above mentioned manner, the other two pistons 214 and 216 are actuated to prject their piston rods 214a and 218a to increase the force with which the laminated body 184 is clamped, so the shape of the new workpiece supporting surface is securely maintained.

It will be appreciated that with this fourth embodiment, different in shape workpieces can be taken care of only by prestoring corresponding kinds of information in the control unit, thus minimizing the number of steps in making correction or alteration to adjust to new workpiece.

Figure 23:
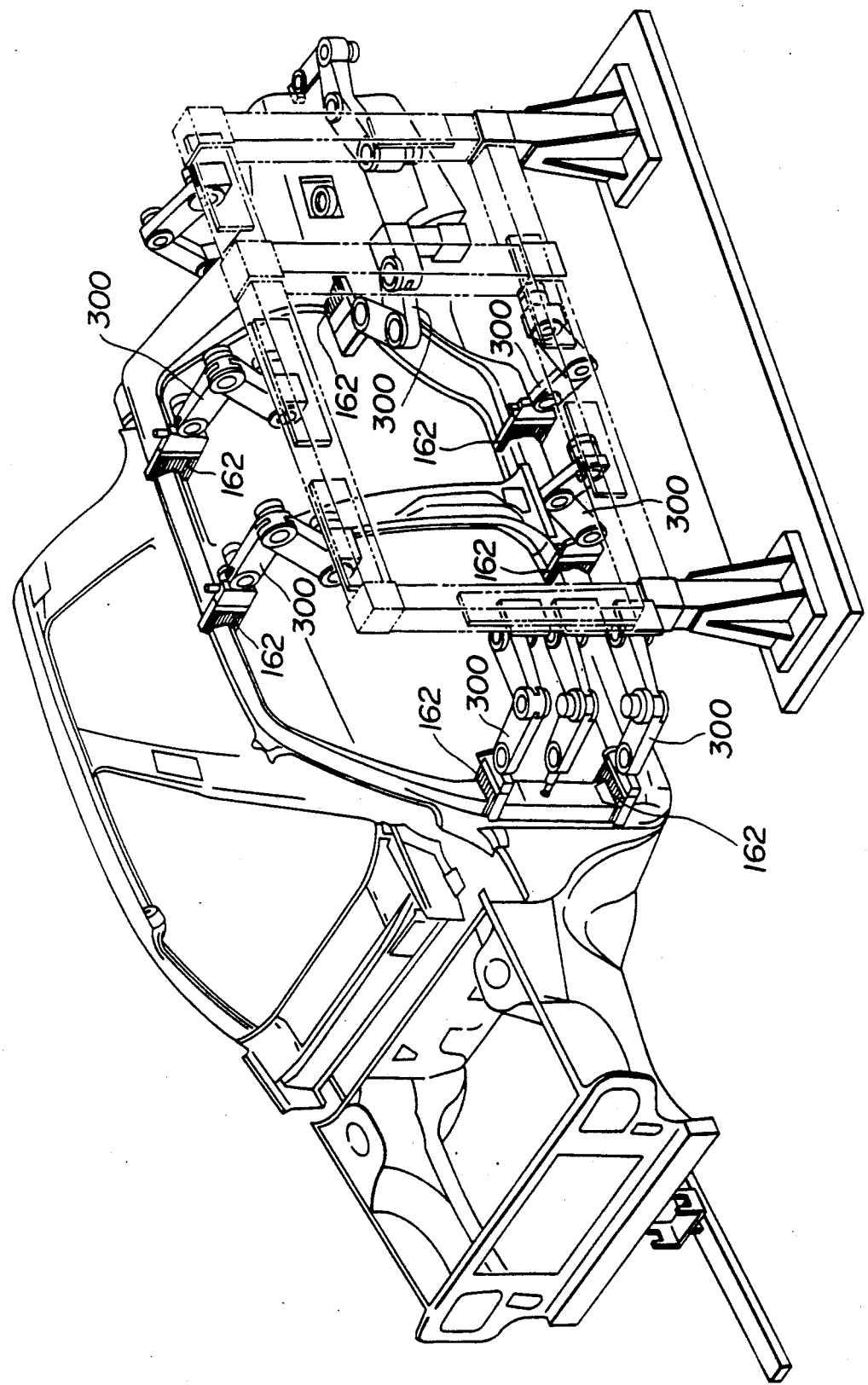
FIG. 23 is a perspective view of a practical application of the holding unit shown in FIG. 12.

Referring lastly to FIG. 23, there is shown one practical application of the holding unit 162 (see FIG. 12). In this application, a plurality of holding units 162 are used in association with articulate type robots 300 so as to position a workpiece 302 in the form of a body side panel.

From the description of the various embodiments according to the present invention, it will now be appreciated that the present invention has provided a machine which is capable of holding a plurality of different, in shape, workpieces one after another with minimum number of steps in adjusting to new workpiece.

What is claimed is:

1. In an assembly line:
a workpiece having first and second opposed end portions with first and second flanges at said opposed end portions, respectively, said first flange and said first end portion forming a first angle therebetween, said second flange and said second end portion forming a second angle therebetween;
a first machine including a first robot, a first mounting bracket supported by said first robot, a first plate having one end supported by said first mounting bracket and an opposite end in supporting contact with said first end portion of said workpiece, a second plate pivotably mounted to said first plate, a first actuator means for adjustably varying an angular relationship between said second plate and said opposite end of said first plate;
a second machine including a second robot, a second mounting bracket supported by said second robot, a third plate having one end supported by said second mounting bracket and an opposite end in supporting contact with said second end portion of said workpiece, a fourth plate pivotably mounted to said third plate, a second actuator means for adjustable varying an angular relationship between said forth plate and said opposite end of said third plate;
said second and fourth plates being disposed adjacent said first and second flanges of said workpiece to interpose said workpiece therebetween.

2. In an assembly line as recited in claim 1, wherein said first machine includes a first rotary actuator means for adjustably varying an angular position of said first plate relative to said first mounting bracket, and said second machine includes a second rotary actuator means for ajustably varying an angular position of said third plate relative to said second mounting bracket.

3. A process comprising the steps of:
supporting a first end portion of a workpiece on a first end of a first plate which has an opposed end supported by a mounting bracket which is in turn supported by a first robot, said workpiece having a second end portion which is opposed to said first end portion and having first and second flanges formed on said first and second end portions to form first and second angles therebetween;
actuating a first actuator to adjustably vary an angular relation between a second plate, disposed adjacent said first flange and pivotally mounted to said first plate, and said first end of said first plate, thereby graphing said first end of said workpiece;
supporting said second end portion of said workpiece on a first end of a third plate which has an opposed end supported by a mounting bracket which is in turn supported by a second robot; and
actuating a second actuator to adjustably vary an angular relation between a fourth plate, disposed adjacent said second flange and pivotally mounted to said third plate, and said first end of said third plate, thereby grasping said second end of said workpiece with said workpiece being interposed between said second and fourth plates.

4. The process of claim 3, further comprising the steps of rotating a first rotary actuator to adjustably vary an angular position of said first plate relative to said first mounting bracket, and rotating a second rotary actuator to adjustably vary an angular position of said third plate relative to said second mounting bracket.

* * * * *